United States Patent
Rotta

(10) Patent No.: US 7,090,127 B2
(45) Date of Patent: Aug. 15, 2006

(54) CONNECTOR IDENTIFICATION MODULE FOR MOBILE PLATFORM

(75) Inventor: Phillip R. Rotta, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 216 days.

(21) Appl. No.: 10/769,645

(22) Filed: Jan. 30, 2004

(65) Prior Publication Data

US 2004/0232232 A1 Nov. 25, 2004

Related U.S. Application Data

(63) Continuation-in-part of application No. 10/190,934, filed on Jul. 8, 2002, now abandoned.

(51) Int. Cl.
$G07B\ 15/02$ (2006.01)

(52) U.S. Cl. ...................... 235/384; 235/486

(58) Field of Classification Search ............ 235/492, 235/384, 487, 486; 439/76.1, 946; 174/48, 174/49, 60
See application file for complete search history.

(56) References Cited

U.S. PATENT DOCUMENTS

| | | | |
|---|---|---|---|
| 4,654,829 A | 3/1987 | Jiang et al. | |
| 5,455,409 A | 10/1995 | Smith et al. | |
| 5,517,407 A | 5/1996 | Weiner | |
| 5,670,768 A | 9/1997 | Modiano et al. | |
| 5,793,989 A | 8/1998 | Moss et al. | |
| 5,854,591 A | 12/1998 | Atkinson | |
| 5,971,274 A | 10/1999 | Milchman | |
| 5,999,295 A | 12/1999 | Vowell et al. | |
| 6,125,405 A | 9/2000 | Farges | |
| 6,127,944 A | 10/2000 | Daly et al. | |
| 6,270,415 B1 | 8/2001 | Church et al. | |
| 6,292,561 B1 * | 9/2001 | Benson | 379/433.13 |
| 6,434,648 B1 | 8/2002 | Assour et al. | |
| 6,467,003 B1 | 10/2002 | Doerenberg et al. | |
| 6,504,093 B1 * | 1/2003 | Cawley | 174/48 |
| 6,601,763 B1 | 8/2003 | Hoch et al. | |
| 6,808,396 B1 * | 10/2004 | Kawaguchi et al. | 439/76.1 |
| 6,914,781 B1 * | 7/2005 | Rotta et al. | 361/690 |
| 6,947,726 B1 * | 9/2005 | Rockwell | 455/411 |
| 2003/0027551 A1 * | 2/2003 | Rockwell | 455/410 |
| 2003/0220022 A1 * | 11/2003 | Kawaguchi et al. | 439/633 |
| 2004/0004130 A1 * | 1/2004 | Rotta | 235/492 |
| 2004/0196978 A1 * | 10/2004 | Godfrey et al. | 380/270 |
| 2004/0205330 A1 * | 10/2004 | Godfrey et al. | 713/150 |
| 2005/0181768 A1 * | 8/2005 | Roy | 455/413 |

* cited by examiner

*Primary Examiner*—Thien M. Le
(74) *Attorney, Agent, or Firm*—Harness Dickey & Pierce P.L.C.

(57) ABSTRACT

A connector for use with a mobile platform, such as an aircraft, which forms a part of the aircraft installation, and which can therefore not be readily removed from the aircraft once installed. In one preferred form the connector includes a standardized connector body that mechanically and electrically couples to an existing electronics module on the mobile platform. The connector body is attached to a backshell having a recess that houses an ID module component. The connector includes a lanyard that is secured to a portion of the mobile platform to prevent removal therefrom. The ID module component includes pre-programmed ID information pertinent to a specific mobile platform on which the connector is to be deployed. The ID module can be configured after it is installed in the system. Advantageously, the electrical connections between the ID module component and the connector itself are all contained within the recess in the backshell.

22 Claims, 5 Drawing Sheets

FIG 3
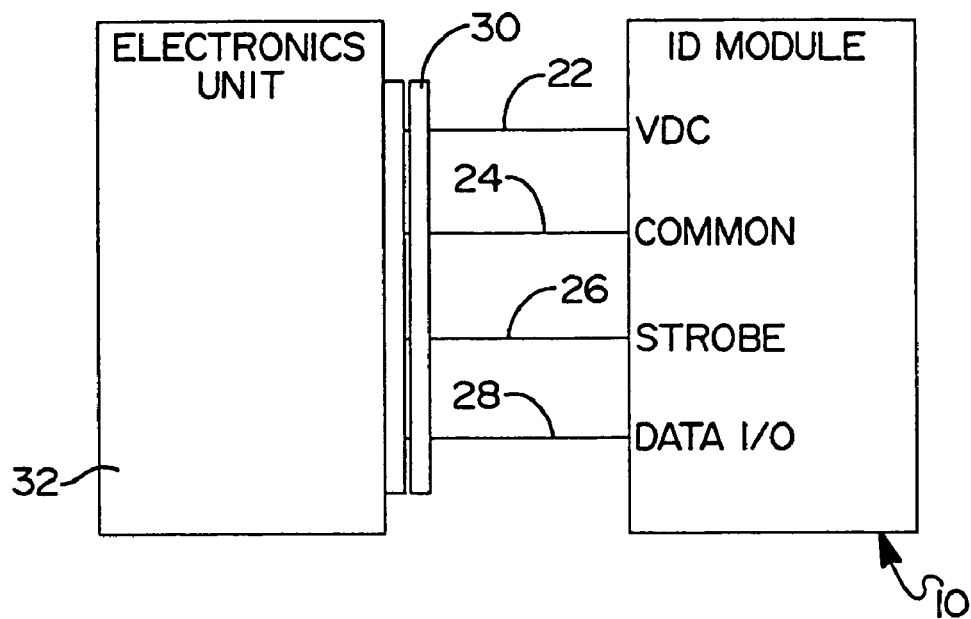
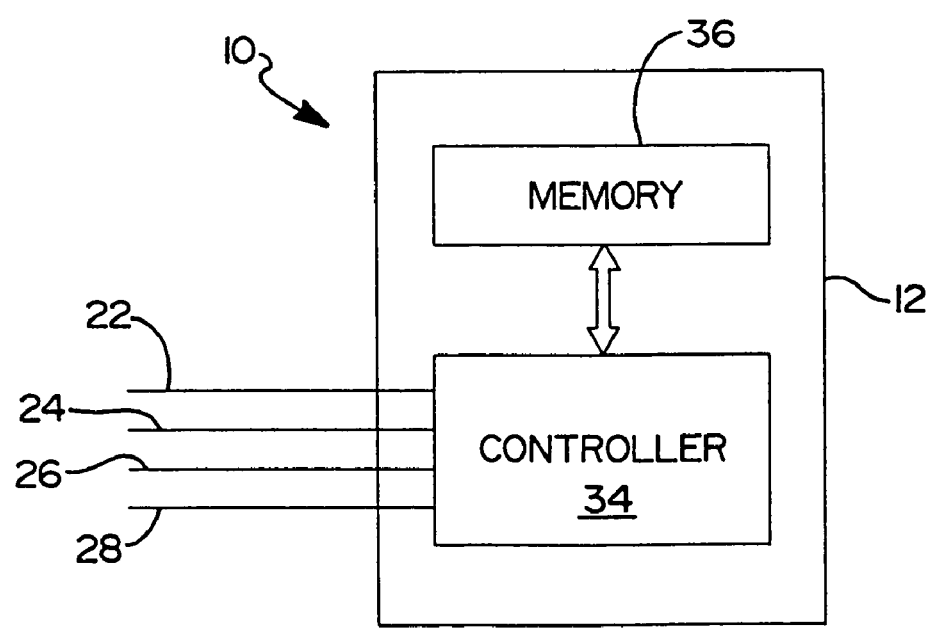
FIG 4

CONNECTOR IDENTIFICATION MODULE FOR MOBILE PLATFORM

CROSS REFERENCE TO RELATED APPLICATION

This application is a continuation-in-part of U.S. patent application Ser. No. 10/190,934 now abandoned, filed Jul. 8, 2002. The disclosure of the above application is incorporated herein by reference.

FIELD OF THE INVENTION

The present system relates to a system for identifying mobile platforms having an identification number or code, and more specifically to an electronic module which is adapted to be electrically and mechanically coupled to or supported on, an existing mobile platform or connector used on the mobile platform so that the identification module cannot be readily removed from the mobile platform.

BACKGROUND OF THE INVENTION

In applications where one of a plurality of mobile platforms, such as, for example, one of a plurality of aircraft, busses, ships, trains, motor craft, etc., need to be identified, it is common to provide some form of identification code to the mobile platform. This allows the mobile platform to identify itself to other, mobile platform or with a base station with which it is in communication with. Often, in communication systems such identification is required to provide a specific network node address which is explicitly associated with a single mobile platform. In this manner, a network operation center can identify and communicate with a single given mobile platform from within a group of mobile platforms operating within a given coverage region, and supply the requested information content to the given mobile platform. Other important platform specific information such as calibration and configuration related information often also needs to be automatically associated with a specific mobile platform.

An identification code as described above could be programmed into one or more of the electronic units that are typically carried on a commercial aircraft. However, information contained in an electronic unit is not tied directly to the aircraft installation (i.e., not tied to those components that are not readily removable from the aircraft) and thus could be separated from the aircraft during normal maintenance actions as electronic units are removed and replaced for service by aircraft mechanics. Thus, associating the identification code or information of a given aircraft with an electronic unit of the aircraft that is capable of being readily removed for service gives rise to a risk that the identification code for a given aircraft could be lost or confused with a different aircraft when the electronic units are replaced.

Previously, an aircraft ID has been associated with a specific aircraft installation by uniquely wiring a set of connector pins within each aircraft installation to be read by an electronic unit of the aircraft via discrete interface pins. Such an approach can require 25 or more connector pins. This, in turn, contributes to the need for larger and more expensive, and heavier, connectors. It also increases installation complexity and span time, and gives rise to an increased chance for wiring errors during installation due to the larger number of wires involved and the uniqueness between each installation, in addition to providing the possibility of increased susceptibility to electromagnetic interference (EMI). The increased number of connector pins also can contribute to a decrease in the reliability of the connector.

Therefore, it would be highly desirable to be able to retain an identification code for a mobile platform, for example an aircraft, which cannot be lost or corrupted because of the removal of one or more electronic units or other electronic components of the aircraft during normal service and/or maintenance operations. It would also be desirable to accomplish this without the need for attaching a large plurality of wires to existing connectors used on a mobile platform. By providing some means for tying the identification code to the mobile platform installation, the risk of losing an identification code for a given mobile platform is significantly reduced.

SUMMARY OF THE INVENTION

An identification (ID) module is provided that physically and electronically couples to a portion of a component of a mobile platform which forms a portion of the mobile platform installation, and therefore cannot be readily removed from the mobile platform. In one preferred form, the module is formed by an ID module that is electrically and physically coupled to an electrical connector, and where the connector forms a part of the mobile platform installation. In one specific form an ID module is provided that is mechanically and electrically coupled to a fixed ARINC 600 electrical connector adapted to be coupled to a removable electronic unit used on a commercial aircraft.

In one preferred form the ID module comprises a housing which houses a memory for storing an identification code uniquely associated with the mobile platform. The ID module receives power from the electronics unit to which it is coupled via the ARINC 600 connector, as well as a clock signal. A data input/output (I/O) port is also in communication with the electronics unit for allowing the electronics unit to query the ID module and obtain the identification information stored therein.

A principal advantage of the ID module is that since it is mechanically coupled to the ARINC 600 connector, it cannot be readily separated from the mobile platform installation. Thus, there is virtually no risk that the ID module will be inadvertently removed from the mobile platform and reinstalled in a different mobile platform. The identification code can be programmed into the ID module during installation of the ID module via the electronics unit after the ID module is installed on the ARINC 600 connector.

In another preferred embodiment the ID module is housed in a standardized electrical connector. The ID module component has pre-programmed identification information and other pertinent data relating to the specific mobile platform in which it is deployed. The ID module is housed within a recess or a compartment on a connector body of the standardized electrical connector to thus form an easily handled and compact assembly. The ID module component is electrically coupled to suitable conductors of a connector insert within the connector body. This provides the additional advantage that no electrical wires need to be exposed outside of the connector body, since the electrical coupling is all accomplished within the recess or compartment of the connector body. In specific preferred embodiments the connector body may comprise a standardized circular connector body having a backshell portion, or a standardized rectangular connector body, or any standardized shape that permits electrical and mechanical coupling to the existing electronic subsystem of the mobile platform.

Further areas of applicability of the system will become apparent from the detailed description provided hereinafter. It should be understood that the detailed description and specific examples, while indicating various preferred embodiments, are intended for purposes of illustration only and are not intended to limit the scope of the system.

BRIEF DESCRIPTION OF THE DRAWINGS

The present system will become more fully understood from the detailed description and the accompanying drawings, wherein:

FIG. 3 is a simplified block diagram drawing of the identification module of the present system coupled to the ARINC 600 connector shown in FIG. 2, with the connector in turn coupled to an electronics unit of the connector;

FIG. 4 is a simplified block diagram of the internal components of the identification module of the present system;

FIG. 6a is a side, partial cross-sectional view of the connector of FIG. 6 with the connector body detached from the backshell;

DETAILED DESCRIPTION OF PREFERRED EMBODIMENTS

The following description of various preferred embodiment(s) is merely exemplary in nature and is in no way intended to limit the system, its application, or uses.

Figure 1:
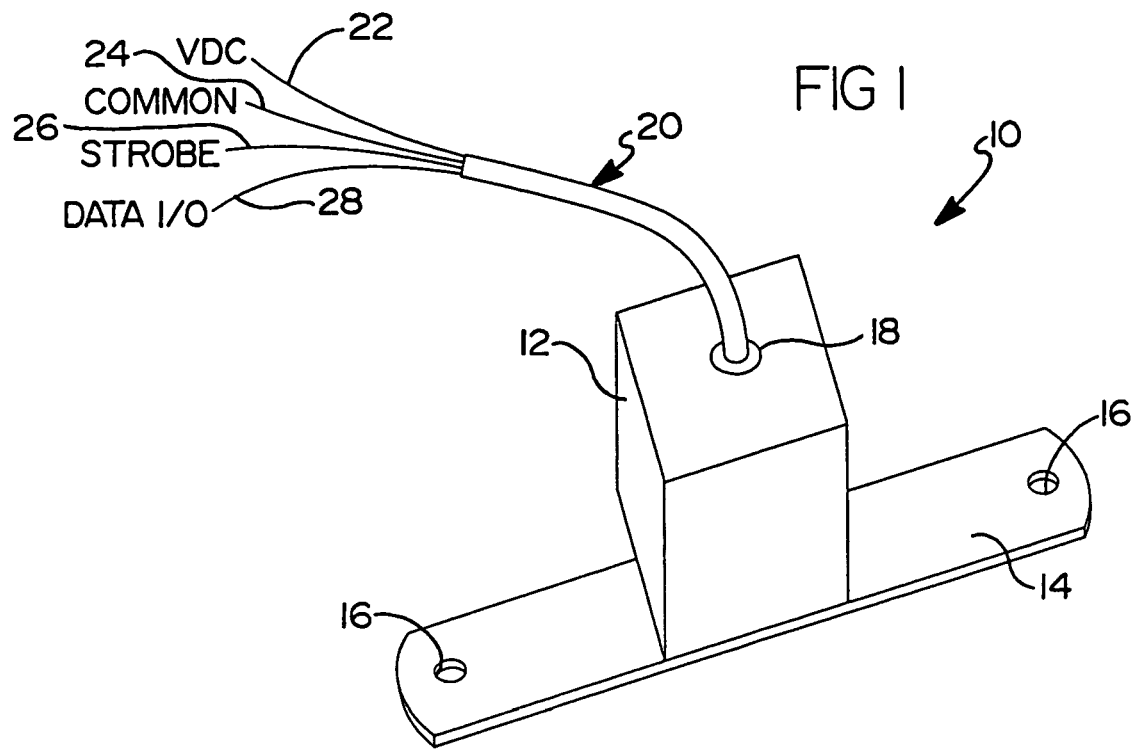
FIG. 1 is a perspective view of a mobile platform identification module in accordance with a preferred embodiment of the system.

Referring to FIG. 1, there is shown an identification (ID) module 10 in accordance with a preferred embodiment of the present system. The ID module 10 is ideally suited to be used on mobile platform where it is highly desirable to make the ID module 10 a part of the mobile platform installation such that it cannot be readily removed from the mobile platform. The ID module 10 is especially well suited for use on commercial aircraft, and the following description will make reference to implementation of the ID module 10 in connection with such commercial aircraft. However, it will be appreciated that the ID module 10 could be used with a wide variety of mobile platforms such as ships, various other marine craft, busses, trains, rotorcraft, etc. where it may be desirable to provide a unique identification code to a particular mobile platform for identifying that specific mobile platform from a larger plurality of similar mobile platforms.

The ID module 10 incorporates a housing 12 having a pair of flanges 14 with holes 16. An opening 18 allows an electrical cable 20 to protrude therefrom. The cable 20 carries preferably four conductors, one for DC power 22, a ground 24, a "strobe" 26 (i.e., "clock"), and a data input/output "I/O" 28 conductor. The housing 12 may be made of any material, such as aluminum or molded plastic, that is sufficiently strong and preferably lightweight to enclose the electronic components of the ID module 10.

Figure 2:
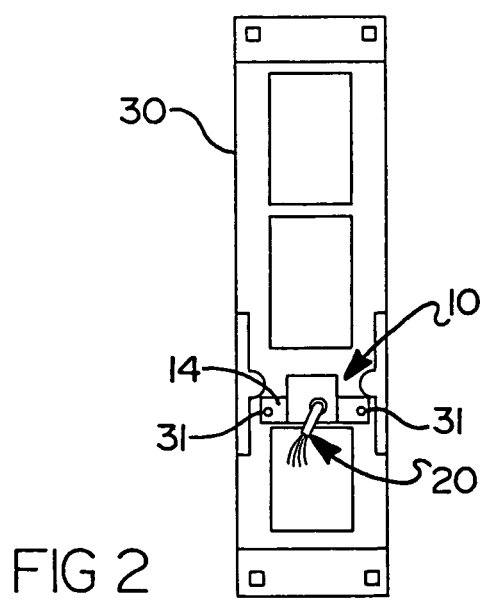
FIG. 2 is a plan view of the identification module of FIG. 1 secured to a conventional ARINC 600 connector, which forms a part of a mobile platform installation.

Referring to FIG. 2, the ID module 10 is shown coupled to a conventional ARINC 600 connector 30. The conductors 22, 24, 26, and 28 are coupled to appropriate pins of the ARINC 600 connector 30 such that DC power can be supplied to the ID module 10 via conductor 22. The ID module 10 is also coupled to a ground pin (not specifically shown) of the connector 30 via conductor 24. A pin carrying a strobe signal from the connector 30 supplies a clock signal to the strobe conductor 26 of the ID module 10, and a pin associated with a data line allows data to be communicated to and from the data I/O conductor 28 of the ID module 10.

The ID module 10 is fixedly coupled via suitable fasteners 31 such as threaded screws, rivets, etc. to the ARINC 600 connector 30. Thus, the ID module 10 cannot be readily removed from the ARINC 600 connector 30 and therefore becomes a part of the aircraft installation. Advantageously, the ID module 10 is compact, lightweight, and does not add appreciably to the complexity, size or weight of the ARINC 600 connector 30, nor does it adversely affect the handling and manipulation of the connector 30. In one preferred form the ID module is approximately 1.4 inch×0.5 inch×0.5 inch (35.56 mm×12.7 mm×12.7 mm).

Referring to FIG. 3, the ARINC 600 connector 30 is intended to couple to an electronics unit 32 of the aircraft or other form of mobile platform. It will be appreciated that the electronics unit 32 comprises a component which may need to be removed from time to time for service and/or repair or replaced by a different but identical electronics unit. If the ID module 10 were associated with the electronics unit 32, then the risk would exist that if the electronics unit 32 is removed from a given aircraft but then subsequently installed in a different aircraft, the unique identification information stored in the ID module 10 could be applied to the wrong aircraft. By fixedly coupling the ID module 10 to the connector 30, this risk is eliminated, since the ARINC 600 connector 30 forms a part of the aircraft installation and is therefore not able to be readily removed from the aircraft.

In operation, the electronics unit 32 operates as the "master" and the ID module 10 operates as the "slave". Communication between the electronics unit 32 and the ID module 10 can alternately be accomplished via a standard RS-485 low speed interface, by a RS-422 interface, by a RS-232 interface, by any other form of wired interface, by an optical fiber, by infrared coupling, or by any other form of wireless coupling. Upon input from an installation person, the electronics unit 32 commands the ID module to store a unique identification code for a specific aircraft. While in service, the electronics unit 32 can at any time request the aircraft ID information from the ID module 10. When an electronics unit 32 is removed and replaced, the new electronics unit automatically requests the aircraft identification code from the ID module 10, thus providing any external system attempting to communicate with the aircraft with the necessary information to identify the aircraft from among a plurality of aircraft.

Referring to FIG. 4, the ID module 10 includes a controller 34 that may comprise for example, a small processor, a micro controller, a Field Programmable Gate Array (FPGA), or an Application Specific Integrated Circuit (ASIC). The controller 34 is in bidirectional communication with a memory 36. Memory 36 can comprise Random Access Memory (RAM), Read Only Memory (ROM), and/ or programmable non-volatile memory such as Electrically Erasable Programmable Read Only Memory (EEPROM). It will be appreciated that memory 36 functionality could be included on a single integrated circuit along with the controller functionally if desired.

Figure 5:
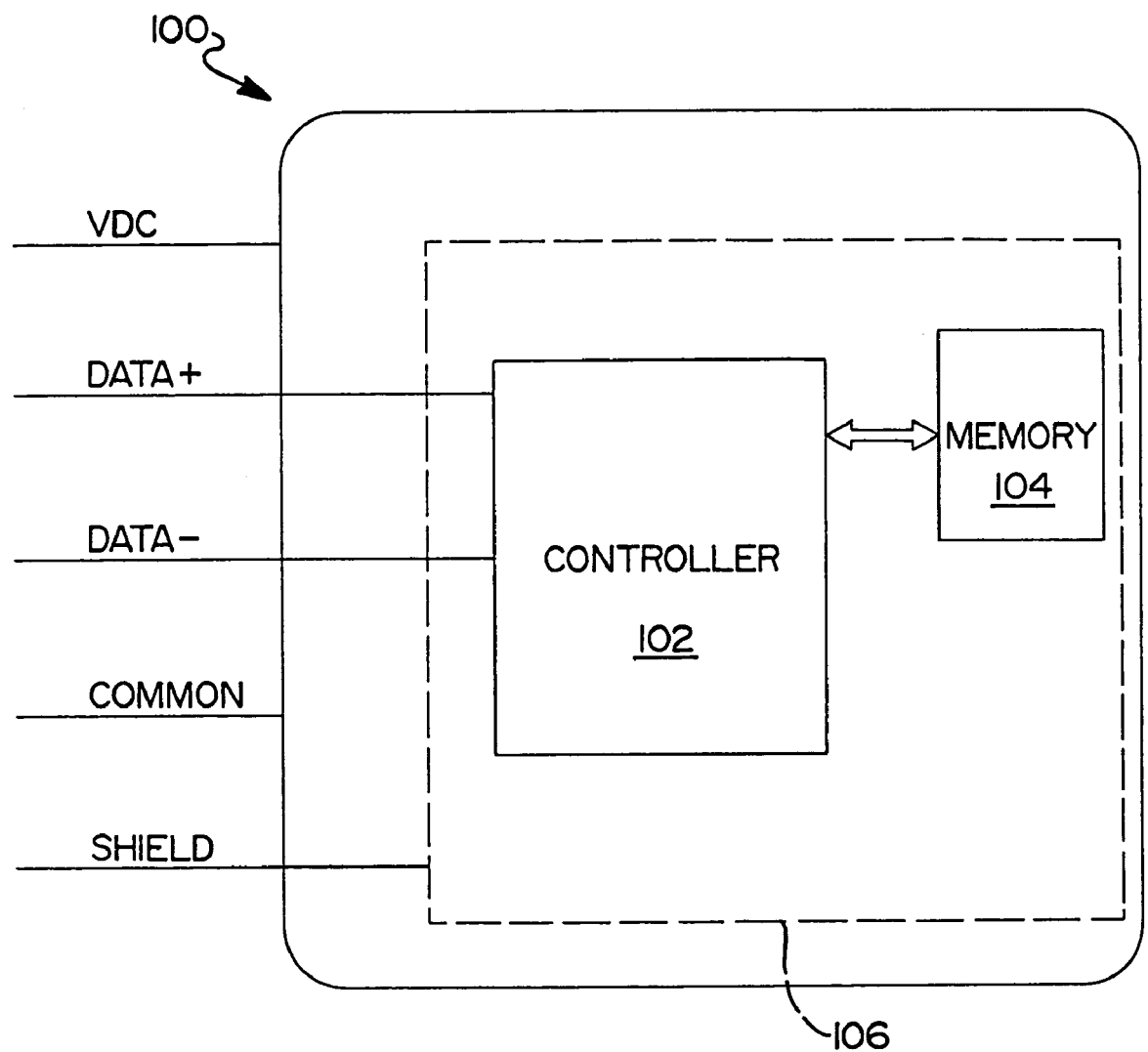
FIG. 5 is a simplified block diagram of an alternative preferred embodiment of the ID module for use with an RS-485 interface.

Referring to FIG. 5, an ID module 100 in accordance with an alternative preferred embodiment of the present system is shown. The ID module 100 is similar to ID module 10 in that it includes a controller 102, which is in bidirectional communication with memory 104. Memory 104 comprises ROM, RAM, and EEPROM. The controller 102, however, is capable of communicating via a more robust RS-485 interface. This is accomplished by the use of "Data+" and "Data−" inputs to the controller 102, which form an electrically balanced data bus. In addition, a shield, represented in highly simplified terms by dashed line 106, provides additional protection against electromagnetic interference (EMI) and against EMI emissions. The RS-485 data interface provides a minimum electrical conductor solution that is electrically robust, balanced, and shielded. The RS-485 interface also has the advantage of being a standard electrical interface.

The ID module described herein thus represents a lightweight, low power, reliable, easy to install component. The ID module further eliminates possible wiring errors because of the limited number of electronical conductors that must be connected to the ARINC 600 connector. It also provides a cost effective solution, from a manufacturing and inventory perspective, because a number of identical ID modules can be programmed after they are installed in the aircraft, thus making the pre-installed ID modules interchangeable. The limited number of conductors associated with the ID module further significantly reduces risk of EMI problems. The ID module requires very little power and provides a very reliable means for associating important, aircraft-specific information with a specific aircraft.

Figure 6:
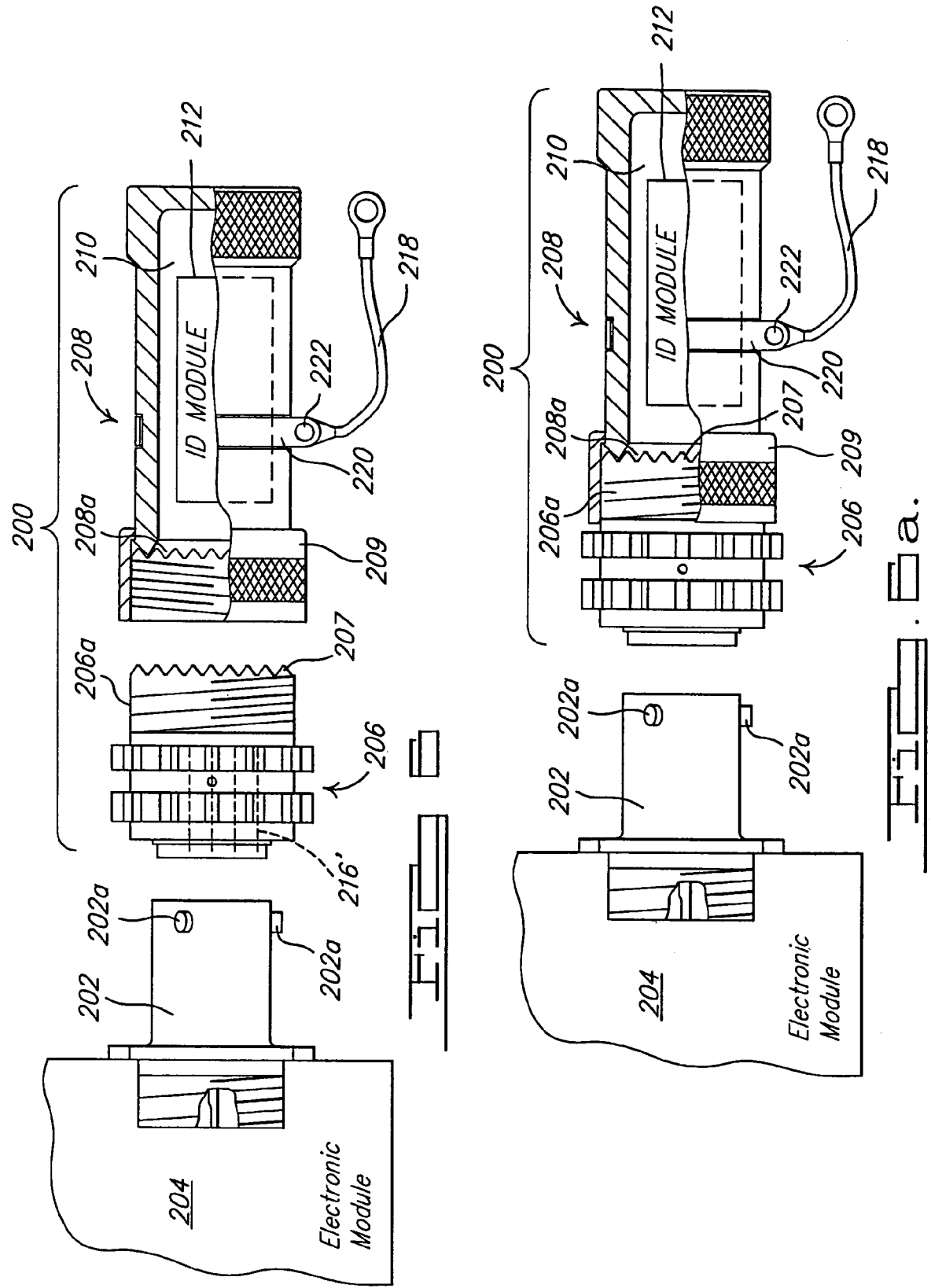
FIG. 6 is a simplified side, partial cross section view of an alternative preferred embodiment of the ID module of the present system.

Referring to FIGS. 6 and 6a, an alternative preferred embodiment is illustrated in the form of a connector 200. Connector 200 differs principally in that rather than having an ID module secured to an external surface thereof, the ID module is physically housed within the connector 200.

The connector 200 in FIGS. 6 and 6a is shown aligned with a standardized connector element 202 of an existing electronic module 204 carried onboard a mobile platform. The connector 200 includes a standardized connector body 206, which in one preferred implementation comprises a standardized circular connector body. The connector body 206 includes internal structure that engages with retaining/alignment posts 202a when the connector body 206 is placed over connector element 202 and rotated to attach it to the connector element. A standard commercial backshell 208 is physically coupled to the connector body 206 such as by a threaded retaining sleeve 209 that engages a threaded neck portion 206a of the connector body 206. The backshell 208 comprises a recess or compartment 210 integrally formed therein which houses an ID module component 212. With brief reference to FIG. 7, the ID module component 212, in one form, includes electrically conductive elements such as pins 212a–212f or conductive wires that enable the ID module component 212 to be electrically coupled to a standard, plastic or other non-conductive, connector insert 216 carried within the connector body 206. The ID module component 212 is inserted into the recess 210 from the left end of the backshell 208, as shown in FIG. 6, before the backshell 208 is threadably coupled to the connector body 206. Serrations 207 on the neck 206a and serrations 208a on the backshell 208 engage to prevent rotation of the backshell as the retaining sleeve 209 is threaded onto the neck portion 206a.

Figure 7:
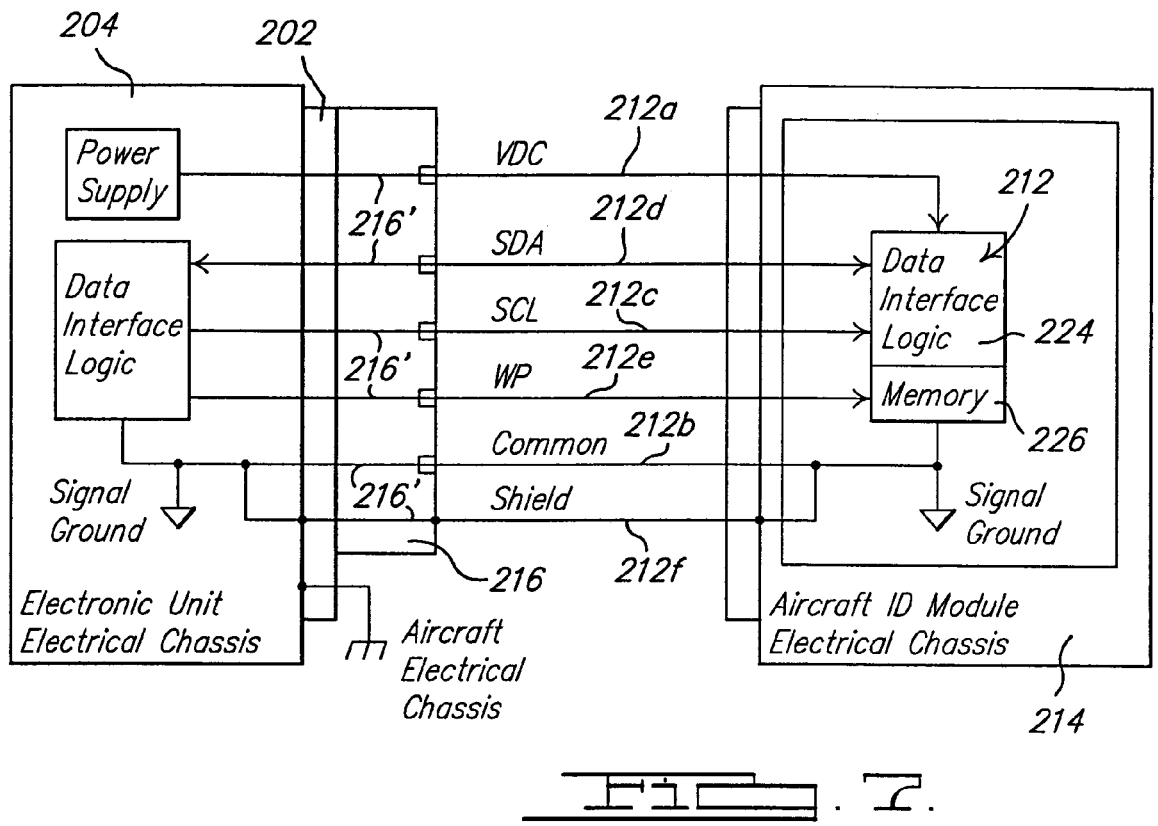
FIG. 7 is a simplified block diagram of the interconnection between the components of the ID module component and the connector block of the connector body.

The coupling of the connector insert 216 and ID module component 212 are shown in simplified schematic form in FIG. 7. In one preferred implementation the ID module component 212 is electrically mounted on a circuit board 214 from which electrically conductive pins or wires 212a–212f extend. Conductors 212a–212f are used to electrically interface the module 212 with receptacles associated with the connector insert 216. Connector insert 216 includes electrically conductive pins 216' (see also FIG. 6) projecting therefrom that interface with connector 202.

With further reference to FIG. 6, to prevent removal of the connector 200 from the mobile platform, a retaining member 218 is secured to a collar 220 circumscribing of the backshell 208 at one end thereof and to a portion of the mobile platform at an opposite end thereof. An eyelet 222 may be provided in the collar 220 to accommodate a threaded screw (not shown) for this purpose. The retaining member 218 may be formed by a flexible cable that effectively forms a lanyard. This prevents the connector 200 from being inadvertently removed from the mobile platform in the event the electronic module 204 is removed for service, inspection or replacement.

A particular advantage of the connector 200 is that since the electrical connections between the connector body 206 and the ID module component 212 are maintained within the recess 210, there are no electrical wires that can be accidentally engaged and damaged when maintenance or repair work is being performed on the mobile platform. This further significantly improves reliability of the connector 200.

Still another advantage of the connector 200 is that since it incorporates standardized connector body 206 and backshell 208, it can implemented without the need to modify a pre-existing connector being used with the electronic module. Therefore, the connector 200 can be easily retrofitted for use on various mobile platforms.

Referring further to FIG. 7, the ID module component 212 of the connector 200 is similar to ID module 10 illustrated in FIG. 3. The ID module component 212 includes a pin 212a for receiving DC power (VDC), a pin 212b providing a ground (COMMON) connection, a pin 212c for receiving a strobe (i.e., clock) input, and a DATA I/O pin 212d for enabling bidirectional communication between the ID module component 212 and the electronic module 204. A pin 212e for transmitting a write protect and a shield connection 212f are also preferably included. It will be appreciated, however, that a shield may not be needed in some implementations. For the embodiments shown in FIGS. 6 and 8 (to be discussed), a shield is not absolutely necessary because of the lack of a physical cable extending between the ID module and the electronic component.

Pins 212a, 212b, 212c and 212d are electrically coupled to a controller 224 that is in communication with a memory 226. Memory 226 can comprise a random access memory (RAM), a read only memory (ROM), or any other suitable form of memory. Memory 226 and controller 224 could be provided on a single integrated circuit, if desired. Memory 226 is pre-programmed with important identification information, as well as other pertinent data, pertaining specifically to the mobile platform which the connector 200 is being deployed in. The ID module memory 226 can be pre-programmed prior to installation or it can be programmed after installation as part of a system calibration, test, and initialization process. A standard $I^2C$ communication protocol could be used for communications. Alternatively, RS-232, RS-485, or virtually any other custom interface protocol could be employed. The ID module component could also optionally include some limited signal/power interface filtering and some limited protection from electrostatic discharge.

Figure 8:
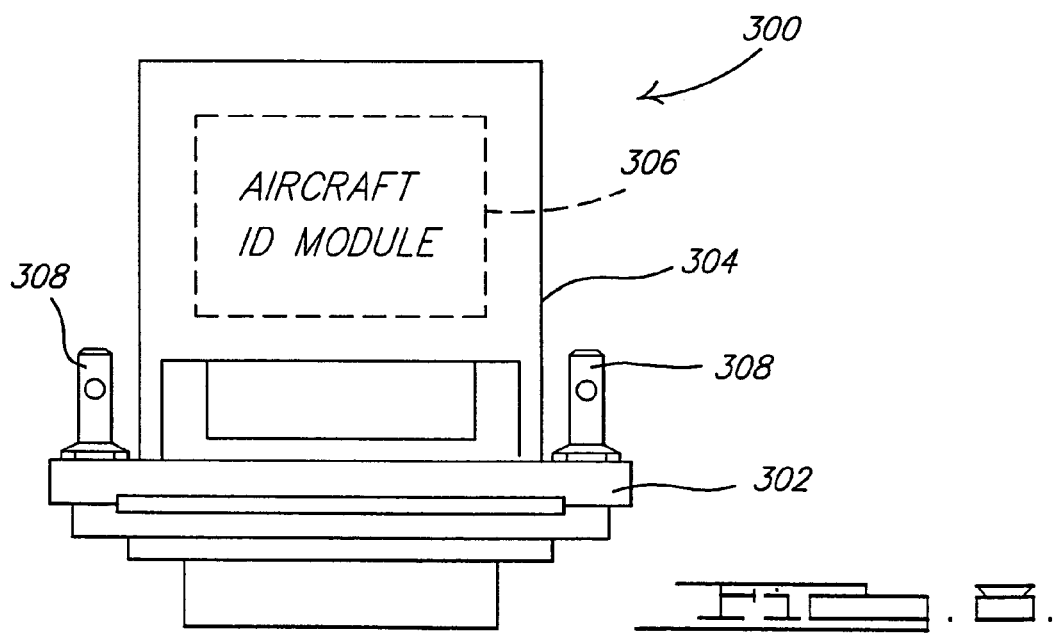
FIG. 8 shows a simplified side view of an alternative preferred form of the connector implemented in connection with a standard rectangular connector.

FIG. 8 illustrates an alternative rectangular connector assembly 300. The rectangular connector assembly 300 is shown to include a connector body 302 with a backshell 304 that houses an ID module 306 of the present system therein. Standard hex cap screws 308 may be implemented to hold the connector body 302 to the electronic component 204. FIG. 8 is intended to illustrate that a wide variety of styles of connectors (e.g., D-type, square type, etc.) can be incorporated to house an ID module.

It will be appreciated, then, that the present system provides a "secure" ID module that cannot be changed (i.e., re-programmed) without specific maintenance operator command to temporarily remove its write protection feature and store data. Without maintenance operator command or intervention, the system is only able to read (not write) data from the ID module.

The ID module of the present system is in contrast to personality modules or uniquely configured connectors that play into a system and define its specific personality or ID information. Such personality modules are either configured at the factory or uniquely wired prior to installation. As a result, each personality module is unique, cannot be used by more than one designated system, and if it was to fail, would require another unique personality module to take its place. Also, such an approach often requires that each personality module has a unique part number that is only compatible with a single system. This has a significant disadvantage from the points of interchangeability, commonality, inventory, spares, ability to mass produce a single component that can be installed in any compatible system, and keeping track of which ID module goes to which system. These disadvantages are overcome by the present system.

Furthermore, with the present system it is not until after the ID module is installed that it received its ID calibration and other unique information. This information can be entered quickly and conveniently by a maintenance technician. This further allows a single ID module to be produced that can be implemented in a wide variety of systems/platforms.

Those skilled in the art can now appreciate from the foregoing description that the broad teachings of the present specification can be implemented in a variety of forms. Therefore, while the system and method described herein has been described in connection with particular examples thereof, the true scope of the system and method should not be so limited since other modifications will become apparent to the skilled practitioner upon a study of the drawings, specification and following claims.

What is claimed is:

1. An electrical connector for use with an existing electrical component of a mobile platform for providing stored data concerning the mobile platform, and wherein the electrical connector forms a permanent component of the mobile platform that is not intended to be readily removable from the mobile platform, and that facilitates communication with a removable electronics subsystem of the mobile platform, the electrical connector comprising:
   a connector body adapted to be removably coupled to said removable electronics subsystem;
   said connector body having a portion with a recess and a plurality of conductor components for electrically interfacing with said removable electronics subsystem;
   an identification module disposed within said recess and electrically coupled to said conductor components such that said identification module forms an integral, internally housed component of said connector body; and
   a retaining component for permanently securing the connector body to the mobile platform.

2. The electrical connector of claim 1, wherein said portion comprises a backshell, said backshell comprising said recess.

3. The electrical connector of claim 1, wherein said connector body comprises a circular connector body.

4. The electrical connector of claim 1, wherein said connector body comprises a rectangular connector body.

5. The electrical connector of claim 1, wherein said retaining component comprises a flexible lanyard cable adapted to be fixedly attached to said mobile platform.

6. The electrical connector of claim 1, wherein said retaining component comprises a collar secured to said portion of said connector body.

7. The electrical connector of claim 1, wherein said identification module includes a memory module for storing information pertinent to said mobile platform.

8. The electrical connector of claim 1, wherein said identification module includes a controller.

9. An electrical connector for use with an existing electrical component of a mobile platform for providing stored data concerning the mobile platform, and wherein the electrical connector forms a permanent component of the mobile platform that is not intended to be readily removable from the mobile platform, and that facilitates communication with a removable electronics subsystem of the mobile platform, the electrical connector comprising:
   a standardized connector body adapted to be removably, electrically coupled to said removable electronics subsystem;
   said standardized connector body having a compartment and a plurality of conductor components for electrically interfacing with said removable electronics subsystem; and
   an identification module containing stored information pertinent to said mobile platform on which it is being deployed, said identification module being disposed within said compartment and electrically coupled to said conductor components such that said identification module forms an integral component of said connector body.

10. The electrical connector of claim 9, further comprising a lanyard cable coupled to said connector body at one end thereof and to a portion of said mobile platform at a second end thereof, for permanently securing said electrical connector within said mobile platform.

11. The electrical connector of claim 9, wherein said standardized connector body comprises a connector portion and a backshell.

12. The electrical connector of claim 9, wherein said backshell comprises said compartment.

13. The electrical connector of claim 9, wherein said standardized connector body comprises a circular connector body.

14. The electrical connector of claim 9, wherein said standardized connector body comprises a rectangular connector body.

15. The electrical connector of claim 9, wherein said identification module comprises a memory for storing said pertinent information.

16. A method for providing predetermined information to a removable electronic module disposed on a mobile platform, comprising:
   using a standardized electrical connector body to removably, electrically couple to said removable electronic module;
   disposing a data storage module within a portion of said standardized electrical connector body;
   storing information in the data storage module that uniquely identifies the mobile platform;
   electrically coupling said data storage module to electrical conductors of said standardized electrical connector; and
   non-removably fastening said standardized connector to a portion of said mobile platform to prevent removal of said standardized connector from said mobile platform.

17. The method of claim 16, wherein using a standardized electrical connector comprises using a circular, standardized electrical connector.

18. The method of claim 16, wherein using a standardized electrical connector comprises using a rectangular, standardized electrical connector.

19. An electronic assembly for use within a mobile platform, comprising:
   an electronic module adapted to be removed from said mobile platform for servicing;
   a standardized electrical connector adapted to be mechanically and electrically releasably coupled to said electronic module, said standardized electrical connector comprising:
      a connector body having a first body portion and a second body portion coupled to one another;
      a memory module housed within said second body portion and containing information pertinent to said mobile platform that is transmitted to said electronic module when said connector body is coupled to said electronic module; and
      a member for fixedly securing said standardized electrical connector to a portion of said mobile platform to prevent removal of said standardized electrical connector from said mobile platform.

20. The electronic module of claim 19, wherein said connector body of said standardized electrical connector comprises a circular connector body.

21. The electronic module of claim 19, wherein said connector body of said standardized electrical connector comprises a rectangular connector body.

22. The electronic module of claim 19, wherein said member comprises a flexible cable.

* * * * *